(12) United States Patent
Christy (10) Patent No.: US 9,326,638 B2
(45) Date of Patent: May 3, 2016

(54) THERMAL BOTTLE SOCK

(75) Inventor: Maureen Christy, Park City, UT (US)

(73) Assignee: FREE TO BE ME PRODUCTS, INC. FL (US)

( * ) Notice: Subject to any disclaimer, the term of this patent is extended or adjusted under 35 U.S.C. 154(b) by 358 days.

(21) Appl. No.: 13/565,306

(22) Filed: Aug. 2, 2012

(65) Prior Publication Data

US 2012/0298096 A1 Nov. 29, 2012

Related U.S. Application Data

(62) Division of application No. 12/580,746, filed on Oct. 16, 2009, now Pat. No. 8,256,411.

(60) Provisional application No. 61/106,747, filed on Oct. 20, 2008.

(51) Int. Cl.
| F24J 1/00 | (2006.01) |
| B65D 25/00 | (2006.01) |
| A61J 9/08 | (2006.01) |
| A47J 36/24 | (2006.01) |
| B65D 81/38 | (2006.01) |
| A47J 36/30 | (2006.01) |

(52) U.S. Cl.
CPC .............. *A47J 36/2411* (2013.01); *A47J 36/30* (2013.01); *B65D 81/3876* (2013.01); *F24J 1/00* (2013.01)

(58) Field of Classification Search
CPC ... A47J 36/30; A47J 36/2411; B65D 81/3876
USPC ........... 126/263.01, 263.02, 263.07; 220/739, 220/903; 215/11.6
See application file for complete search history.

(56) References Cited

U.S. PATENT DOCUMENTS

| 1,659,185 | A | | 2/1928 | Baker |
| 1,669,061 | A | | 5/1928 | Meltzer |
| 1,791,357 | A | | 2/1931 | Guarino |
| 2,733,710 | A | | 2/1956 | Zibell |
| 2,773,710 | A | | 2/1956 | Zibell |
| 3,796,067 | A | * | 3/1974 | East ..................... A41B 11/005 66/178 R |
| 3,804,076 | A | | 4/1974 | Fant et al. |
| 4,401,245 | A | | 8/1983 | Zills |
| 4,461,030 | A | | 7/1984 | Knudsen |
| 4,514,995 | A | * | 5/1985 | Curtis et al. .................... 66/170 |
| 4,802,602 | A | | 2/1989 | Evans et al. |
| 4,838,242 | A | | 6/1989 | Oblon |
| 4,961,235 | A | * | 10/1990 | Williger ............... A41B 11/006 2/239 |
| 5,800,492 | A | | 9/1998 | Manker |
| 6,092,519 | A | | 7/2000 | Fish et al. |
| 6,234,165 | B1 | | 5/2001 | Creighton et al. |
| 6,824,112 | B2 | | 11/2004 | Lange |
| 7,152,750 | B2 | | 12/2006 | Coffey |
| 7,243,509 | B2 | | 7/2007 | Trinh et al. |
| 2003/0146228 | A1 | | 8/2003 | Davis et al. |
| 2006/0186129 | A1 | | 8/2006 | Allnutt et al. |
| 2007/0125677 | A1 | | 6/2007 | Oronsky et al. |
| 2007/0215618 | A1 | | 9/2007 | Wright et al. |

* cited by examiner

*Primary Examiner* — William G Corboy
(74) *Attorney, Agent, or Firm* — Allen, Dyer, Doppelt, Milbrath & Gilchrist, P.A.

(57) ABSTRACT

A bottle warmer includes a flexible tubular sleeve having a closed lower end and an open upper end. The open upper end is to receive a bottle therethough, and the closed lower end is to receive a bottom of the bottle thereagainst. An elastic band is carried by a medial portion of the flexible tubular sleeve to secure the medial portion to an adjacent portion of the bottle, and permit the open upper end to be folded back adjacent the closed lower end to define a pocket. A chemical heat source element is to be received by the pocket for warming the bottle.

13 Claims, 7 Drawing Sheets

THERMAL BOTTLE SOCK

RELATED APPLICATION

This is a divisional patent application of U.S. patent application Ser. No. 12/580,746 filed Oct. 16, 2009, the entire disclosure of which is hereby incorporated herein by reference.

This application claims the benefit of U.S. Provisional Application Ser. No. 61/106,747 filed Oct. 20, 2008, the entire contents of which are incorporated herein by reference.

FIELD OF THE INVENTION

The present invention relates to thermal bottle holders, and more particularly, to a thermal bottle sock that heats a fluid within a bottle.

BACKGROUND OF THE INVENTION

Bottles are frequently used to transport a fluid for later use or consumption. While the fluid remains in the bottle, it is often desirable or even necessary to maintain the fluid at or near a desired temperature. Additionally, it may be desirable to keep the fluid initially at one temperature and then raise the fluid to a higher temperature before use or consumption. For example, if baby milk or formula stored in a bottle is to be brought on an outing, such as a picnic, it may be desirable that the bottle be kept cool to inhibit bacteria formation and/or growth, and then warmed to a desired temperature prior to consumption by the baby.

Various devices have been proposed for at least partially achieving this objective. For example, U.S. Pat. No. 1,669,061 discloses an insulated wrap for baby bottles. Such a wrap, however, only serves to passively resist changes in temperature. On the other hand, U.S. Pat. Nos. 3,804,076, 4,838,242, and 6,234,165 disclose devices in which an active heating effect can be produced by thermal elements. However, these devices require elaborate, often bulky structures and sometimes utilize potentially toxic and/or messy thermal elements.

SUMMARY OF THE INVENTION

In view of the foregoing background, an object of the present invention is to provide a thermal bottle sock that allows active heating of a fluid within a bottle for an extended period of time while being portable and relatively straightforward to use.

This and other objects, features, and advantages in accordance with the present invention are provided by a bottle warmer comprising a flexible tubular sleeve having a closed lower end and an open upper end, with the open upper end to receive a bottle therethough and the closed lower end to receive a bottom of the bottle thereagainst. An elastic band may be carried by a medial portion of the flexible tubular sleeve to secure the medial portion to an adjacent portion of the bottle, and permit the open upper end to be folded back adjacent the closed lower end to define a pocket. At least one chemical heat source element is to be received by the pocket for warming the bottle.

The chemical heat source element may comprise an air activated heat source layer. The chemical heat source element may comprise a single chemical heat source element or a plurality of chemical heat source elements. For a single chemical heat source element, it may have an elongated shape for wrapping around the bottle. The chemical heat source elements may have opposing ends each comprising an adhesive layer for adhesively securing the chemical heat source elements to the inner sleeve. The chemical heat source elements may further comprises a removable layer on each adhesive layer to protect the adhesive layers prior to application to the inner sleeve.

The chemical heat source elements may be selectively activated when exposed to air, and heat the fluid in the bottle to a desired range. The fluid may be formula or breast milk, for example. The desired range may be within 90-104 degrees, for example. Once heated, the chemical heat source elements may maintain the temperature of the fluid within the desired range for about 8 hours, which advantageously allows another bottle to be placed in the thermal bottle sock for warming after the fluid in the initial bottle has been consumed.

The flexible tubular sleeve comprises a fabric material. The fabric material may comprise an elastic fabric, and may comprise an air-permeable fabric. For example, the fabric material may comprise cotton and spandex. The cotton may be within a range of 80 to 97 percent of the fabric material, and the spandex may be within a range of 3 to 20 percent of the fabric material.

Another aspect of the invention is directed to an apparatus comprising a bottle, and a bottle warmer as described above.

Yet another aspect of the invention is directed to a method for heating a fluid contained within a bottle using a bottle warmer comprising a flexible tubular sleeve as described above. The method may comprise inserting the bottle through the open upper end of the flexible tubular sleeve so that the closed lower end of the flexible tubular sleeve receives a bottom of the bottle, with the elastic band securing the medial portion of the flexible tubular sleeve to an adjacent portion of the bottle. The method may further comprise pulling the open upper end of the flexible tubular sleeve away from the elastic band to expose the closed lower end of the flexible tubular sleeve, and positioning at least one chemical heat source element adjacent the closed lower end of the flexible tubular sleeve for warming the fluid in the bottle. The open upper end of the flexible tubular sleeve may then be folded over the at least one chemical heat source element so that the open upper end is adjacent the closed lower end of the flexible tubular sleeve to define a pocket for the at least one chemical heat source element.

DETAILED DESCRIPTION OF A PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
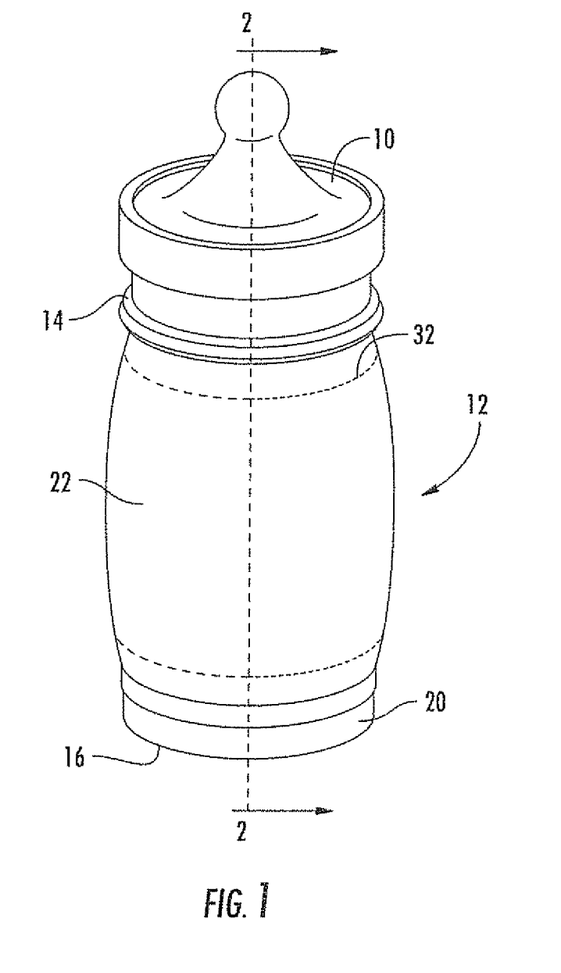
FIG. 1 is a perspective view of a bottle and thermal bottle sock according to the present invention.
Figure 2:
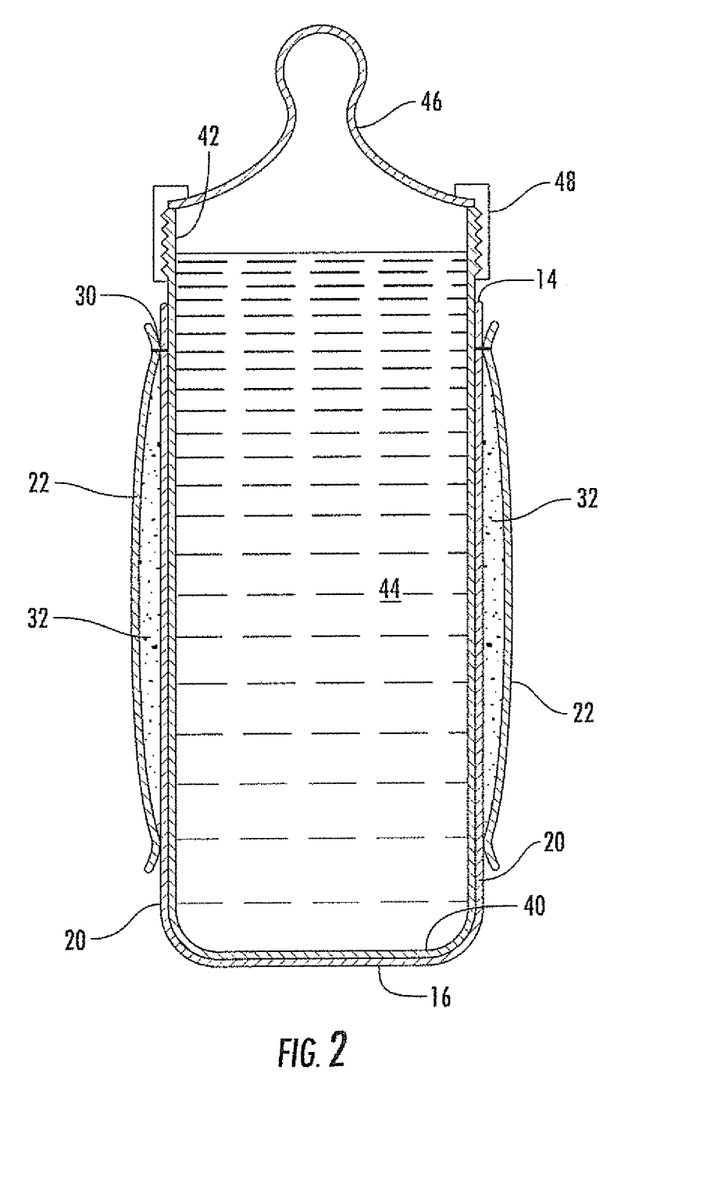
FIG. 2 is a cross-sectional side view of the bottle and thermal bottle sock taken along line 2-2 of FIG. 1.

Referring to FIGS. 1 and 2, a bottle 10 is held by a thermal bottle sock 12. The thermal bottle sock 12 may also be referred to as a bottle warmer. The thermal bottle sock 12 extends between a first end 14 and a second end 16, and includes an inner sleeve 20 and an outer sleeve 22. The inner and outer sleeves 20, 22 are both connected to an elastic band or collar 30, proximate to the first end of the thermal bottle sock 12. A thermal element 32 is accommodated around the bottle 10 between the inner and outer sleeves 20, 22, and serves as a warmer.

The bottle 10 has a body 40 with an open end 42. The body is at least partially filled with a fluid 44. The fluid 44 may be formula or breast milk, for example, or any other type of liquid that requires a heated temperature to be maintained. The open end 42 is covered by a nipple 46, through which the fluid 44 is selectively dispensed. A cap 48 secures the nipple 46 over the open end 42 of the body 40.

The inner sleeve 20 is open proximate to the first end 14 of the thermal bottle sock 12, allowing the body 40 of the bottle 10 to be accommodated therein. The inner sleeve 20 is closed proximate to the second end 16 of the thermal bottle sock 12, setting a lower limit to the insertion of the body 40. The outer sleeve 22 is connected to the inner sleeve 20 at the elastic band 30, allowing the outer sleeve 22 to be folded about the elastic band 30 up and away from the inner sleeve 20.

Figure 3:
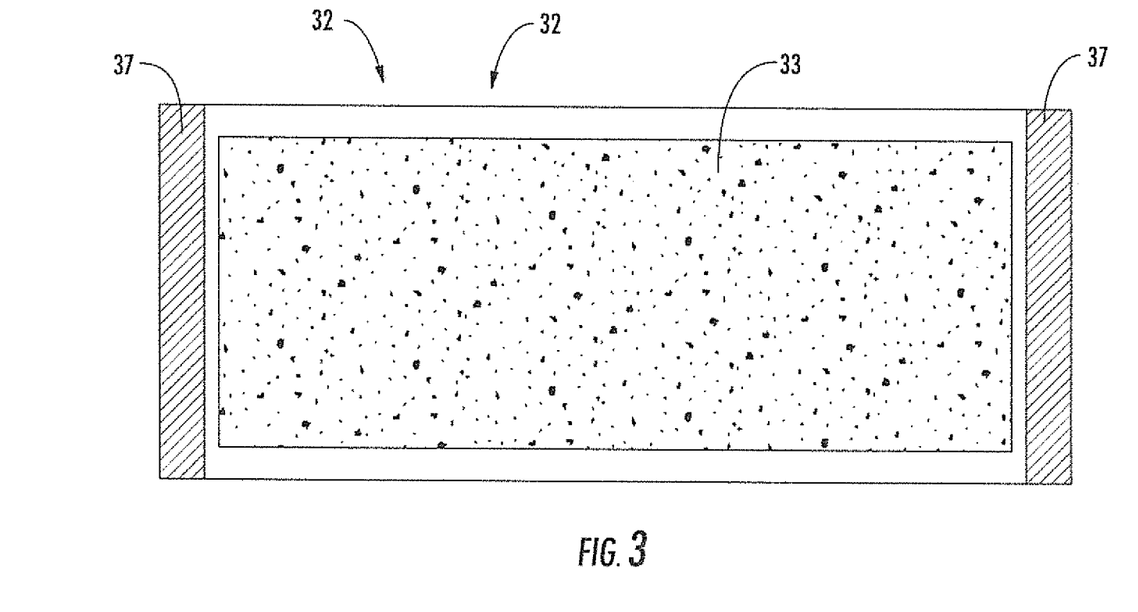
FIG. 3 is a schematic view of a thermal element used with the thermal bottle sock shown in FIG. 1.

As noted above, the thermal element 32 is accommodated around the bottle 10 between the inner and outer sleeves 20, 22 and serves as the warmer. The thermal element 32 is formed from a thermal medium capable of producing a thermal effect for warming the fluid 44 in the bottle 10. As illustrated in FIG. 3, the thermal element 32 is a chemical heat source element that comprises an air activated heat source layer 33. The air activated heat source layer 33 avoids the user having to boil or microwave an element to be placed in the pocket for heating the fluid 44 in the bottler 10. Prior to use, the thermal element 32 is stored in an airtight packaged as readily appreciated by those skilled in the art.

When needed, the thermal element 32 is simply removed from the airtight package and exposed to air, and then gradually heats the fluid 44 in the bottle 10 to within a desired range. In the illustrated embodiment, the thermal element 32 has opposing ends each comprising an adhesive layer 37 for adhesively securing the thermal element 32 to the inner sleeve 20. The thermal element 32 further comprises a removable layer on each adhesive layer 37 to protect the adhesive layers prior to application to the inner sleeve.

Although not illustrated, the thermal element 32 may be configured as a thermal element sleeve that slips over the inner sleeve 20. The thermal element sleeve comprises an elastic fabric material. Instead of using adhesive to secure the thermal element 32 to the inner sleeve 20, the elastic fabric material holds the thermal element sleeve in place. In this embodiment, the thermal element sleeve may comprise one or more air activated heat source layers 33.

The desired range that the fluid 44 is heated is typically within 90-104 degrees, for example. The actual temperature will vary depending on several factors, such as the size of the thermal element 32, and the type of fabric material making up the thermal bottle sock 12.

Once heated, the thermal element 32 maintains the temperature of the fluid 44 within the desired range for an extended period of time, with 8 hours being typical. This advantageously allows another bottle to be placed in the thermal bottle sock 12 for warming after the fluid in the initial bottle 10 has been consumed. The air-activated heat pads sold by Mediheat, Inc. of Dalton, Ga. are suitable for use as warmers. Other types of heat pads are also acceptable, as will be readily appreciated by those skilled in the art.

Figure 4:
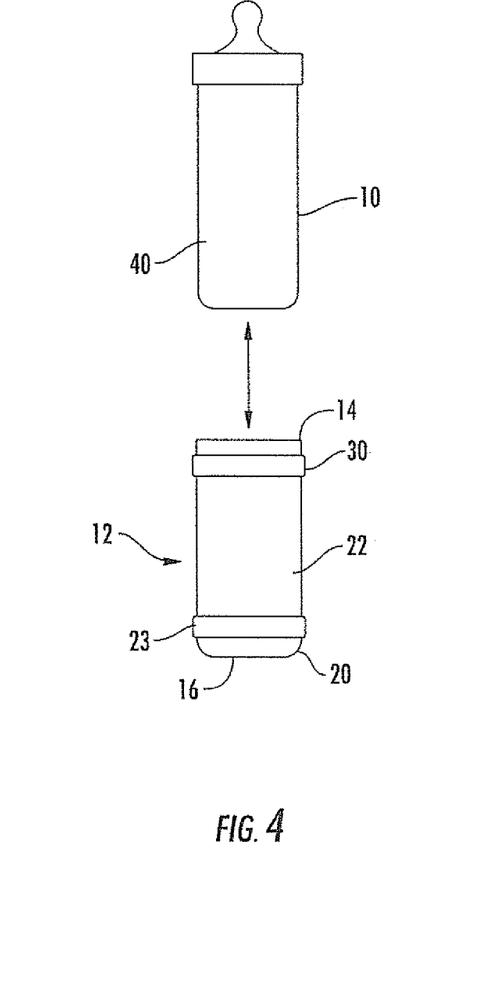
FIGS. 4, 5 and 6 are schematic views of various stages of use of the bottle and thermal bottle sock shown in FIG. 1.
Figure 5:
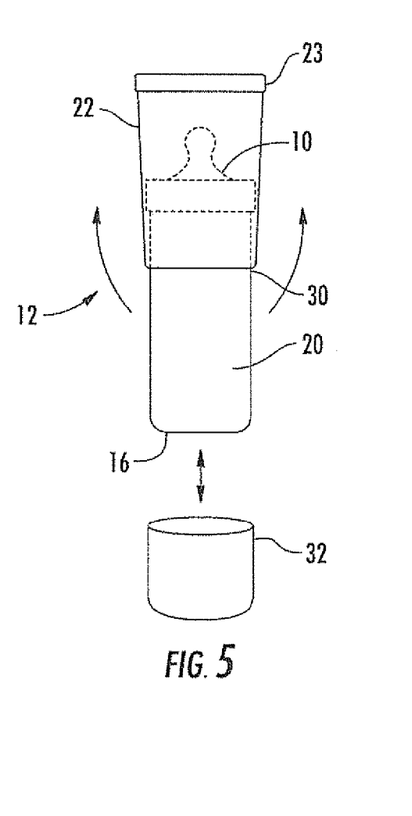
Figure 6:
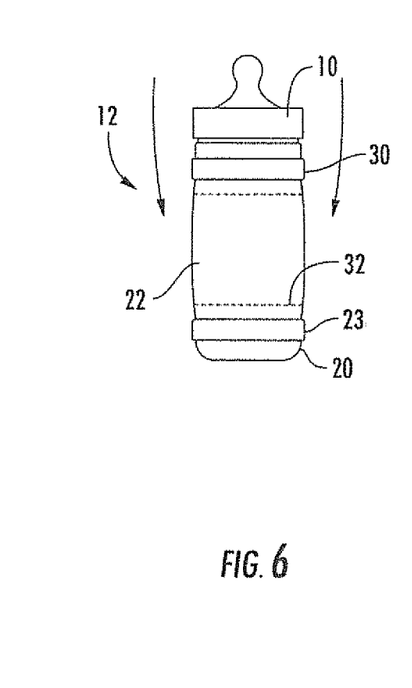

Referring to FIGS. 4-6, in operation, the bottle 10 is inserted into the thermal bottle sock 12 such that at least a portion of the body 40 extends to the second end 16 and fills the inner sleeve 20, causing the inner and outer sleeves 20, 22 to expand to accommodate the body 40. Pressure exerted due to expansion of the inner and outer sleeves 20, 22, as well as the elastic band 30, holds the thermal bottle sock 12 against the bottle 10.

The outer sleeve 22 is folded up and substantially away from the inner sleeve 20, exposing a greater area of the inner sleeve 20. The thermal element 32 is then located around the exposed area of the inner sleeve 20, surrounding a portion of the body 40. The outer sleeve 22 is then folded back down to overlie the inner sleeve 20, further expanding and covering the thermal element 32. Pressure between the expanded inner and outer sleeves 20, 22 keeps the thermal element 32 in place, such that the thermal element 32 warms the fluid 44 in the body 40 of the bottle 10. Subsequent replacement of the bottle 10 or thermal element 32 is accomplished by repeating the applicable steps.

Another way to describe the thermal bottle sock 12 is as a flexible tubular sleeve 20, 22 having a closed lower end 16 and an open upper end 23, with the open upper end to receive the bottle 10 therethough and the closed lower end to receive a bottom of the bottle 10 thereagainst. An elastic band 30 is carried by a medial portion of the flexible tubular sleeve 20 to secure the medial portion to an adjacent portion of the bottle 10, and permit the open upper end 23 to be folded back adjacent the closed lower end 16 to define a pocket. The thermal element 32 is to be received by the pocket for warming the fluid 44 in the bottle 10.

The flexible tubular sleeve 20, 22 comprises a fabric material. In one embodiment, the fabric material comprises cotton and spandex. The spandex is an elastic synthetic fabric that allows the cotton to stretch, yet not too much so that the heat is allowed to escape from the pocket. The cotton may be within a range of 80 to 97 percent of the fabric material, and the spandex may be within a range of 3 to 20 percent of the fabric material. The resting diameter of the elastic band 30 is within a range of about 20% to 40% of the diameter of the body 40 of the bottle 10. This insures that the flexible tubular sleeve 20, 22 remains in place on the bottle 10.

From the foregoing, it will be appreciated that the illustrated thermal bottle sock 12 is completely collapsible and easily stored when not in use. The thermal bottle sock 12 also allows active maintenance of a bottle 10 at a desired temperature for an extended period of time, while enabling quick and easy insertion, removal and replacement of both the bottle 10 and the thermal element 32.

Additionally, the thermal bottle sock 12 is not limited to a particular design, type or size of bottle, and the term "bottle" as used herein should be understood to encompass any container used for the portable storage of a fluid, unless otherwise expressly limited. Those skilled in the art will understand that the various elements of the thermal bottle sock 12, such as the inner and outer sleeves 20, 22, will need to be appropriately dimensioned based on the dimensions of the bottles to be accommodated therein.

Also, the inner and outer sleeves 20, 22 can be formed of any suitable material. Cotton and polyester are example materials, as both possess a sufficient degree of expansibility in readily available weaves, and which are relatively inexpensive and easy to work with. The inner and outer sleeves 20, 22 can be made from the same material or from different materials. The inner sleeve 20 may be made of a thermally-conductive material and/or sufficiently thin, at least in the area to be covered by the thermal element 32, such that thermal effect produced by the thermal element 32 is readily transferred to the bottle 10. The outer sleeve 22 may also be formed of a thermally insulative material, and/or sufficiently thick, to inhibit the thermal effect produced by the thermal element 32 from being transferred to the surrounding environment.

The inner or outer sleeve 20, 22 can also be made from a highly elastic material, such as elastane, or a relatively inexpensive material, such as a rip-stop nylon. Those skilled in the art will appreciate that other design modifications can be made with, or apart from, such material selections. For example, if the elasticity of the material used for the inner sleeve 20 is sufficiently high to ensure the inner sleeve 20 is securely held to the bottle 10, the elastic band 30 can, for example, be dispensed with. If a relatively inflexible material is used for the outer sleeve 22, another elastic band, or a snap, zipper or the like, can be added to the outer sleeve 22 proximate to the second end 16 to ensure that the thermal element 32 is secured held in place by the outer sleeve 22.

Although connection of the inner and outer sleeves proximate the first end 14 of the thermal bottle sock 12 has been found to be advantageous as facilitating folding of the outer sleeve 22 upward while keeping to inner sleeve 20 around the bottle 10, the inner and outer sleeves 20, 22 may be connected at another location, such as proximate the second end 16, and may be made integral with one another or even separable.

Figure 7:
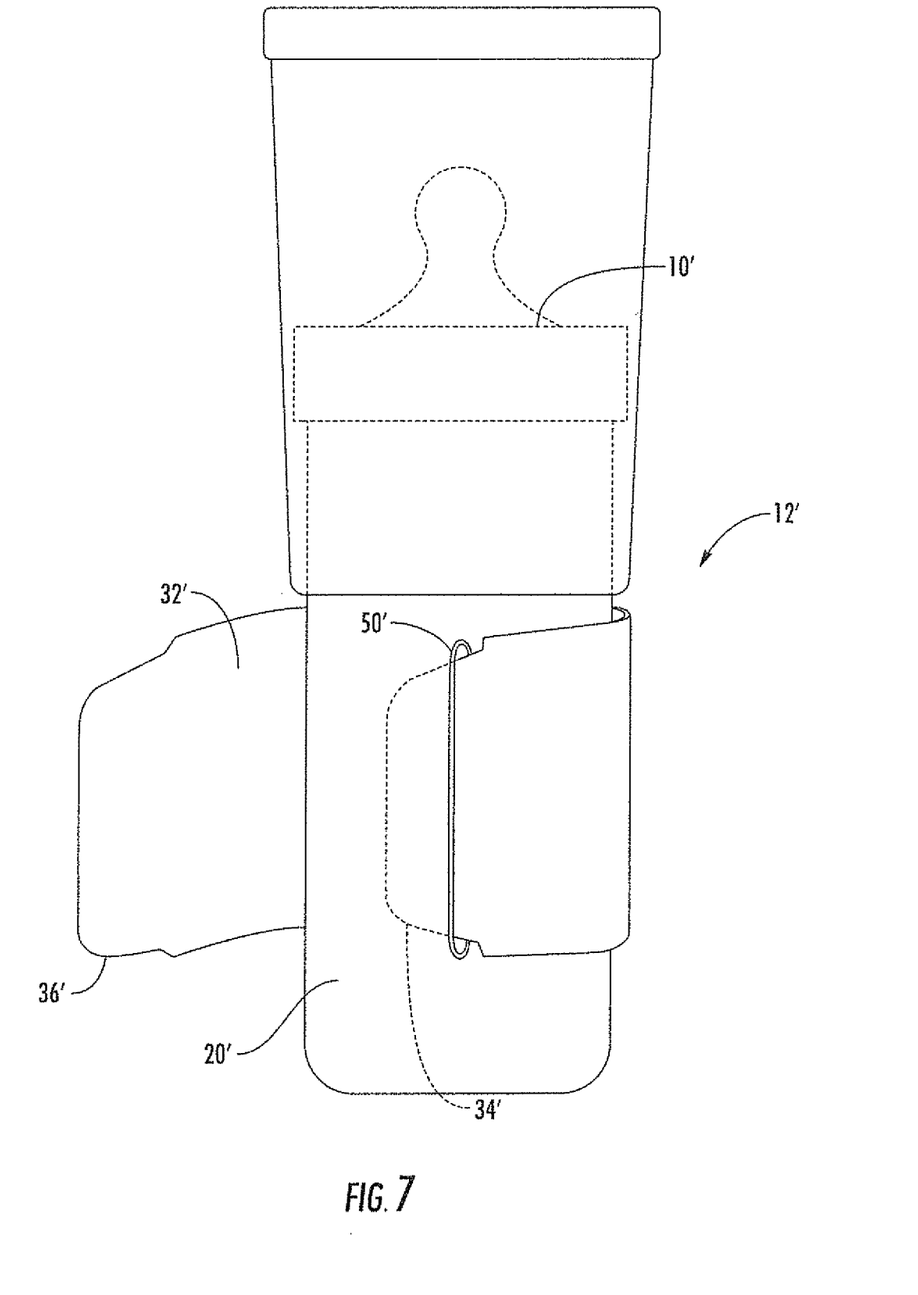
FIG. 7 is a perspective view of a thermal bottle sock according to an alternate embodiment of the present invention.

Referring to FIG. 7, an alternate embodiment of the thermal bottle sock 12' will now be discussed. The bottle 40' is held by the thermal bottle sock 12', which includes an inner sleeve 20'. A thermal element 32', with first and second tabs 34', 36' at opposite ends thereof, is wrapped around the inner sleeve 20'. The first tab 34' is accommodated within a slit 50' formed in the inner sleeve 20', thereby facilitating proper positioning of the thermal element 32' around the inner sleeve 20' and bottle 40'.

Figure 8:
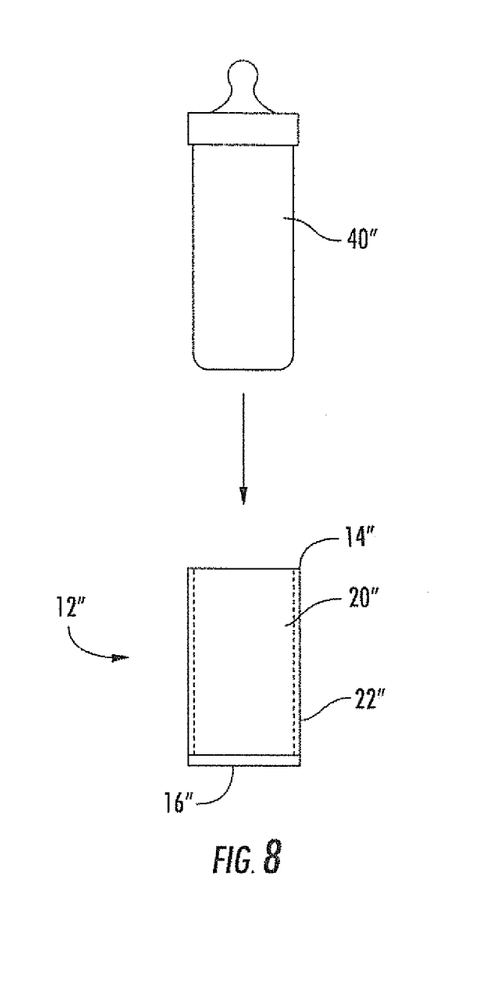
FIGS. 8, 9 and 10 are schematic views of various stages of use of the bottle and thermal bottle sock according to another alternate embodiment of the present invention.
Figure 9:
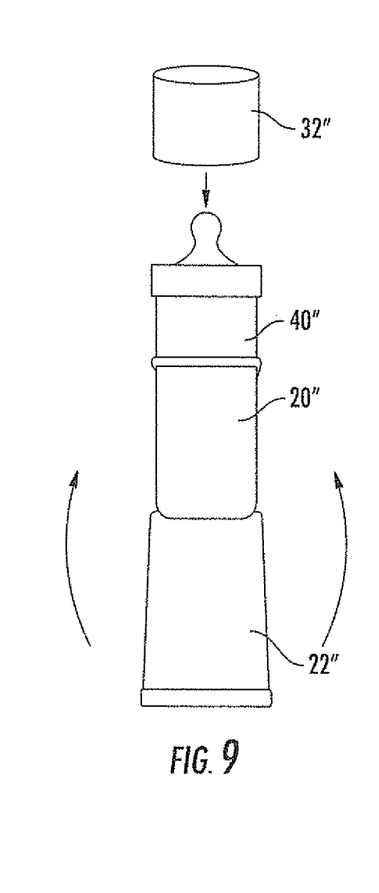
Figure 10:
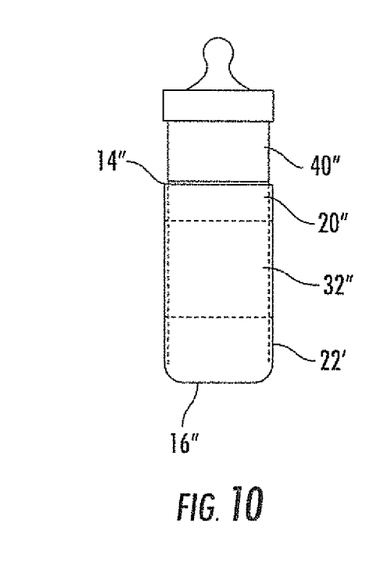

Referring to FIGS. 8-10, operation of the bottle sock 12" and insertion of the thermal element 32" will be discussed for the embodiment of the inner and outer sleeves 20", 22" being connected at the second end 16" thereof instead of at the first end 14". As illustrated in FIG. 8, the bottle 40 is inserted into the first end 14" of the bottle sock 12". The inner and outer sleeves 20", 22" are adjacent one another.

After the bottle 40 has been inserted, the outer sleeve 22" is pulled down, as best illustrated in FIG. 9. The thermal element 32" is positioned around the inner sleeve 20". After the thermal element 32" has been positioned, the outer sleeve 22" is pulled back up toward the first end 14" of the bottle sock 12". As illustrated, the outer and inner sleeves 22", 20" are attached together at the second end 16" of the bottle sock 12". The attachment may be such that the second end 16" of the bottle sock 12" forms a double layer. Alternatively, the outer sleeve 22" may be attached at the second end 16" of the bottle sock 12" such that the second end of the bottle sock forms a single layer.

The thermal element 32 may be in multiple pieces instead of the single illustrated piece. Multiple slits or pockets may be formed in or on the inner sleeve 20 to accommodate such pieces, and other means such as hook and loop fasteners or releasable adhesives may be used to secure the thermal element 32 to the inner sleeve 20. Additionally, other thermal elements for warming or cooling are known to those skilled in the art, and are also suitable for use in connection with the current invention, in addition to the thermal elements provided by Mediheat, Inc.

Another aspect of the invention is directed to a method for heating a fluid contained within a bottle 10 using a thermal bottle sock 12 as described above. Referring to the flowchart 80 in FIG. 11, the method comprises from the start (Block 82), inserting the bottle 10 through the open upper end 23 of the flexible tubular sleeve 12 at Block 84 so that the closed lower end 16 of the flexible tubular sleeve 12 receives a bottom of the bottle. The elastic band 30 secures the medial portion of the flexible tubular sleeve 12 to an adjacent portion of the bottle 10. The open upper end 23 of the flexible tubular sleeve 12 is pulled away from the elastic band 30 to expose the closed lower end 16 of the flexible tubular sleeve 12 at Block 86.

Figure 11:
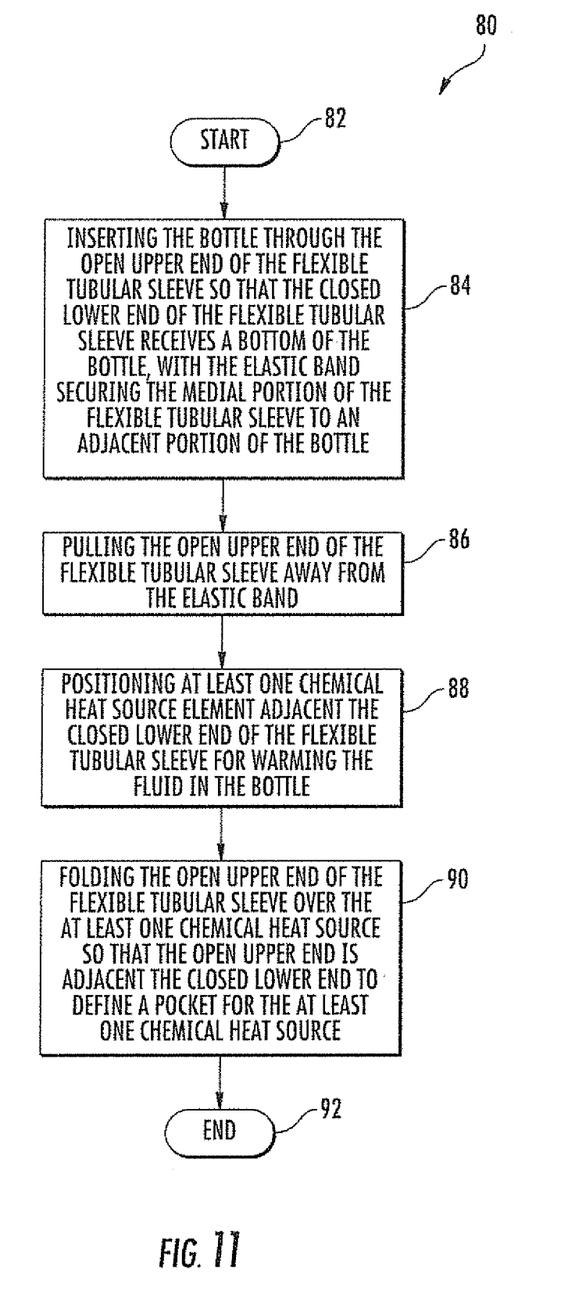
FIG. 11 is a flow chart illustrating a method for heating a fluid contained within a bottle using a thermal bottle sock as shown in FIG. 1.

The method further comprises positioning at least one chemical heat source element 32 adjacent the closed lower end 16 of the flexible tubular sleeve 12 for warming the fluid in the bottle 10 at Block 88. The open upper end 23 of the flexible tubular sleeve 12 is folded over the at least one chemical heat source element 32 at Block 90 so that the open upper end 23 of the flexible tubular sleeve 12 is adjacent the closed lower end 16 of the flexible tubular sleeve 12 to define a pocket for the at least one chemical heat source element. The method ends at Block 92.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A bottle warmer comprising:
    a flexible tubular sleeve comprising an inner sleeve having a closed lower end and an outer sleeve having an open upper end, with the open upper end aligned with the closed lower end, and with the open upper end to receive a bottle therethough and the closed lower end to receive a bottom of the bottle thereagainst;
    an elastic band carried by a medial portion of said flexible tubular sleeve between said inner and outer sleeves to secure the medial portion to an adjacent portion of the bottle, and permit the open upper end to be folded back adjacent the closed lower end to define a pocket between the open upper end and the closed lower end, with the outer sleeve overlying the inner sleeve; and
    at least one chemical heat source element to be received by the pocket for warming the bottle, with the at least one chemical heat source element being held within the pocket by the open upper end being an elastic material that is folded back adjacent the closed lower end and exerting pressure against the at least one chemical heat source element.

2. The bottle warmer according to claim 1 wherein said at least one chemical heat source element comprises an air activated heat source layer.

3. The bottle warmer according to claim 1 wherein said at least one chemical heat source element comprises a single chemical heat source element having an elongated shape for wrapping around the bottle.

4. The bottle warmer according to claim 3 wherein said single chemical heat source element has opposing ends each comprising an adhesive layer for adhesively securing said single chemical heat source element adjacent the closed lower end of said flexible tubular sleeve.

5. The bottle warmer according to claim 4 wherein said single chemical heat source element further comprises a removable layer on each adhesive layer to protect said adhesive layers prior to application to adjacent the closed lower end of said flexible tubular sleeve.

6. The bottle warmer according to claim 1 wherein said flexible tubular sleeve comprises a fabric material.

7. The bottle warmer according to claim 6 wherein said fabric material comprises an air-permeable fabric.

8. The bottle warmer according to claim 6 wherein the fabric material comprises cotton and spandex.

9. The bottle warmer according to claim 8 wherein the cotton is within a range of 80 to 97 percent of the fabric material, and wherein the spandex is within a range of 3 to 20 percent of the fabric material.

10. The bottle warmer according to claim 1 wherein said elastic band is adjacent the open upper end of said flexible tubular sleeve.

11. An apparatus comprising:
a bottle; and
a bottle warmer comprising
a flexible tubular sleeve comprising an inner sleeve having a closed lower end and an outer sleeve having an open upper end, with the open upper end aligned with the closed lower end, and with the open upper end to receive the bottle therethough and the closed lower end to receive a bottom of the bottle thereagainst, an elastic band carried by a medial portion of said flexible tubular sleeve between said inner and outer sleeves to secure the medial portion to an adjacent portion of the bottle, and permit the open upper end to be folded back adjacent the closed lower end to define a pocket between the open upper end and the closed lower end, with the outer sleeve overlying the inner sleeve, and at least one chemical heat source element to be received by the pocket for warming a fluid in the bottle, with the at least one chemical heat source element being held within the pocket by the open upper end being an elastic material that is folded back adjacent the closed lower end and exerting pressure against the at least one chemical heat source element.

12. The apparatus according to claim 11 wherein said at least one chemical heat source element comprises a single air activated heat source layer having an elongated shape for wrapping around said bottle, and wherein said single chemical heat source element has opposing ends each comprising an adhesive layer for adhesively securing said single chemical heat source element adjacent the closed lower end of said flexible tubular sleeve.

13. The apparatus according to claim 11 wherein said flexible tubular sleeve comprises an air-permeable fabric.

* * * * *